(12) United States Patent
Holzmann et al.

(10) Patent No.: US 9,162,241 B2
(45) Date of Patent: Oct. 20, 2015

(54) METERING DISPENSER

(75) Inventors: Werner Holzmann, Marktoberdorf (DE); Anton Brugger, Marktoberdorf (DE)

(73) Assignee: Anton Brugger, Marktoberdorf (DE)

( * ) Notice: Subject to any disclaimer, the term of this patent is extended or adjusted under 35 U.S.C. 154(b) by 0 days.

(21) Appl. No.: 13/818,764

(22) PCT Filed: Aug. 23, 2011

(86) PCT No.: PCT/EP2011/004226
§ 371 (c)(1),
(2), (4) Date: Apr. 17, 2013

(87) PCT Pub. No.: WO2012/031687
PCT Pub. Date: Mar. 15, 2012

(65) Prior Publication Data
US 2013/0299514 A1    Nov. 14, 2013

(30) Foreign Application Priority Data
Aug. 23, 2010   (DE) .................. 20 2010 011 715 U

(51) Int. Cl.
*B05B 11/00*   (2006.01)
*G01F 11/02*   (2006.01)

(52) U.S. Cl.
CPC ......... *B05B 11/0081* (2013.01); *B05B 11/3005* (2013.01); *B05B 11/3084* (2013.01); *G01F 11/023* (2013.01); *B05B 11/0037* (2013.01)

(58) Field of Classification Search
CPC ............ B05B 11/0081; B05B 11/3005; G01F 11/023; B05C 17/00553
USPC .............. 222/137, 134, 309, 145.7, 163, 255, 222/283; 239/353, 333
See application file for complete search history.

(56) References Cited

U.S. PATENT DOCUMENTS

| | | | | |
|---|---|---|---|---|
| 5,169,029 A | * | 12/1992 | Behar et al. | ........................ 222/1 |
| 5,848,732 A | * | 12/1998 | Brugger | ......................... 222/137 |
| 6,454,135 B1 | * | 9/2002 | Brozell | ......................... 222/135 |
| 6,464,107 B1 | | 10/2002 | Brugger | |
| 2002/0142028 A1 | * | 10/2002 | Elliesen et al. | ............... 424/449 |

FOREIGN PATENT DOCUMENTS

| | | |
|---|---|---|
| EP | 0461010 A1 | 12/1991 |
| EP | 1104336 A1 | 6/2001 |
| WO | WO-02/20170 A1 | 3/2002 |

* cited by examiner

*Primary Examiner* — Kevin P Shaver
*Assistant Examiner* — Robert Nichols, II
(74) *Attorney, Agent, or Firm* — Venable LLP; Stefan J. Kirchanski

(57) ABSTRACT

For the straightforward, easy-to-assemble construction of a metering dispenser (1) for dispensing a substance consisting of a number of components, having at least two containers (6a, 6b) in an outer sleeve (8) for accommodating the components of the substance, and having a pumping unit (2a, 2b) on each of the containers (6a, 6b), and having an adjusting device (3), which makes it possible to adjust the quantity ratio of the components in relation to one another, and having a movable actuating device (4) for the pumping units (2a, 2b) and/or containers (6a, 6b), and having a dispenser element (5) for the substance which is to be dispensed by the metering dispenser (1), it is proposed to provide a force-transmission element (7), in particular in the form of an intermediate wall, which, with the actuating device (4) activated, can be displaced relative to the outer sleeve (8) and in the axial direction (A) of the metering dispenser (1).

9 Claims, 4 Drawing Sheets

Figure 8:
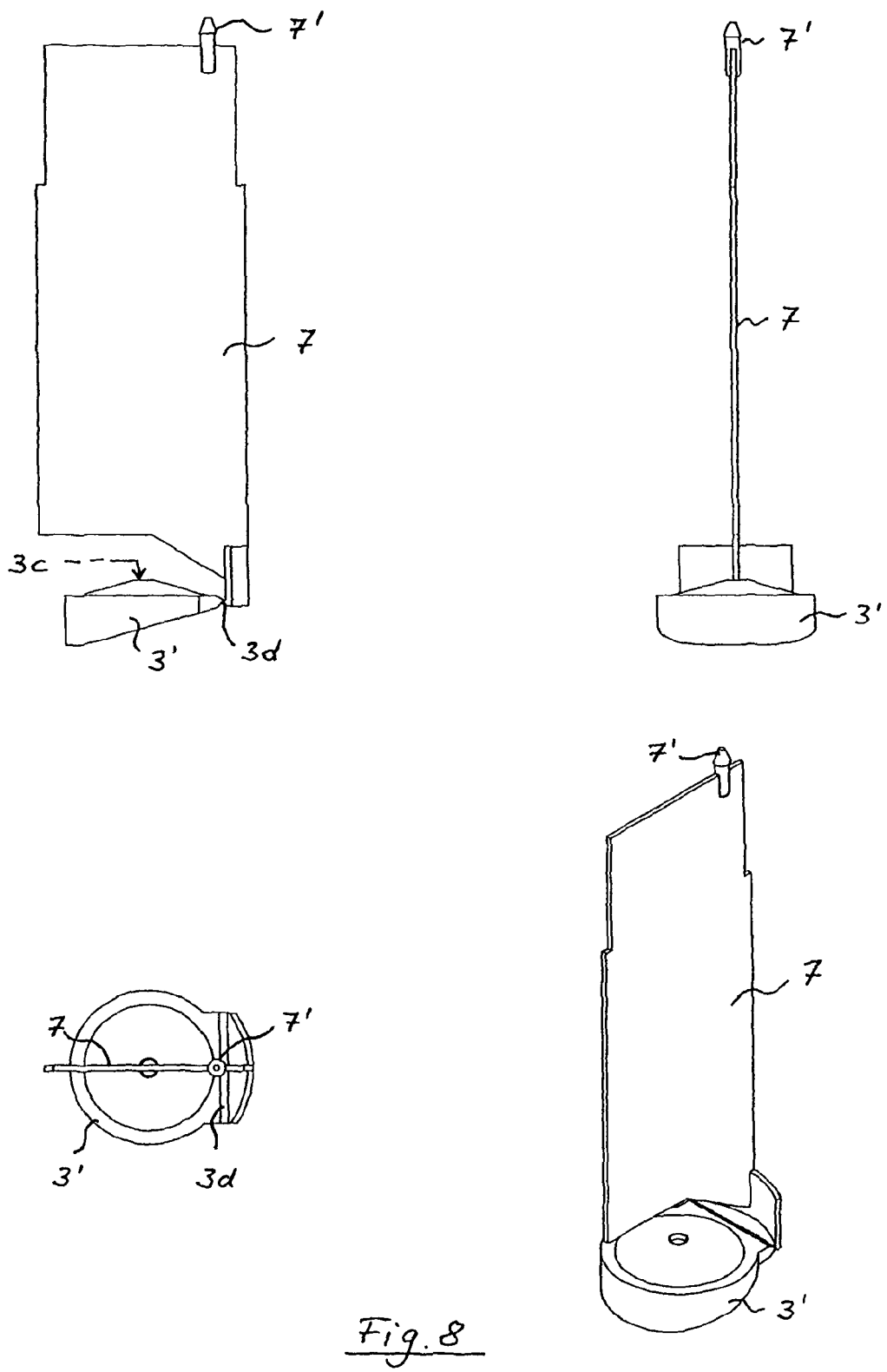

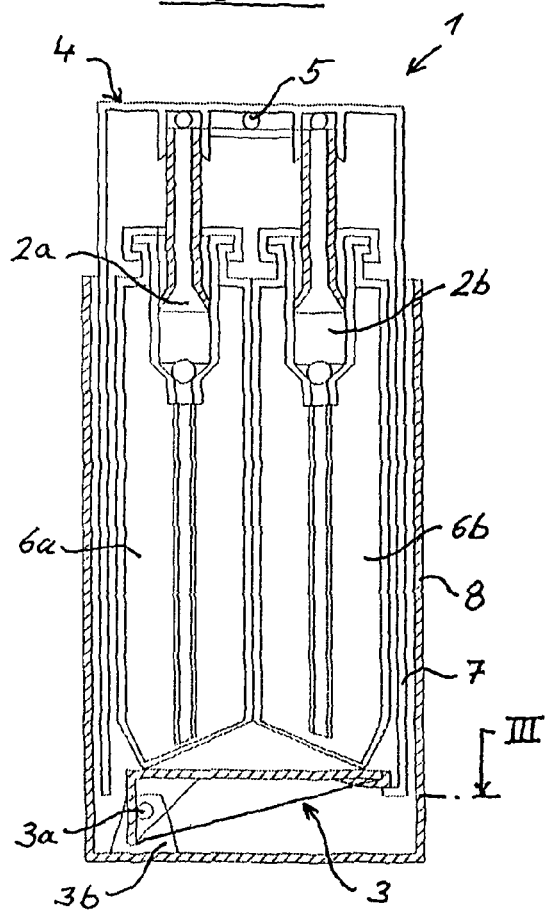
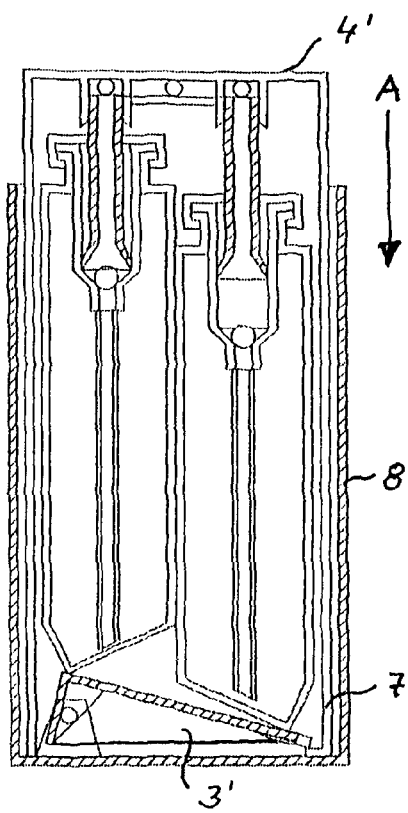
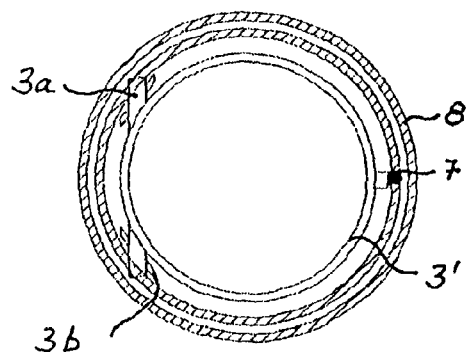

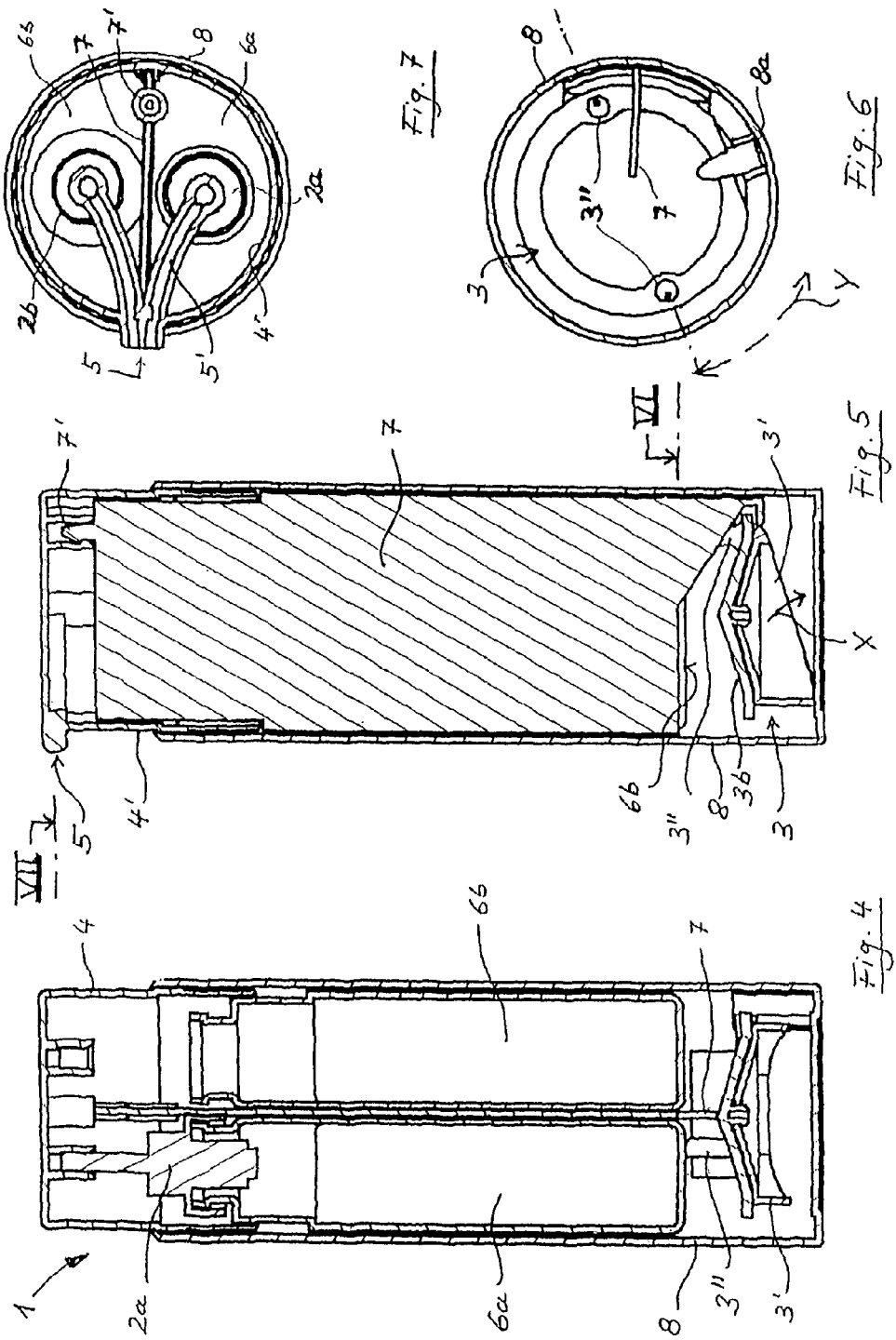

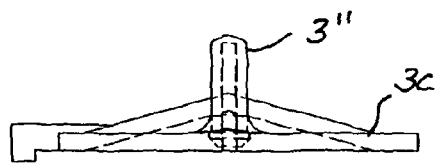
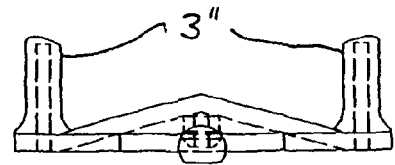
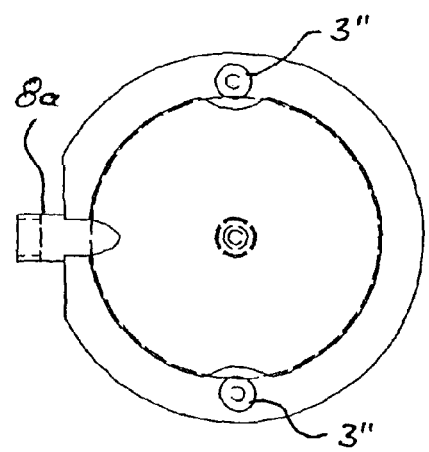
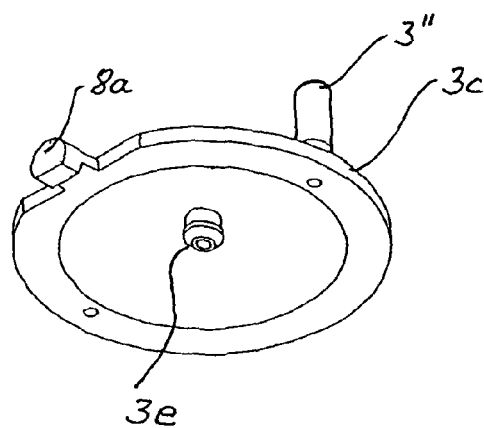
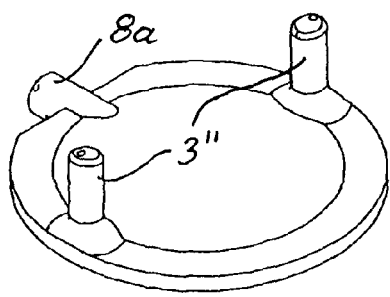
Fig. 9

METERING DISPENSER

The invention relates to a dispenser for dispensing a multi-component substance with the features of the preamble of claim 1.

EP 1 104 336 discloses a dispenser, wherein the mixing ratio of two pasty or liquid components is continuously adjustable. The dispenser is a considerable simplification for the consumers in order to choose the mixing ratio of the components and to coordinate the mixed components to their personal needs. The dispenser provides two cartridges with associated pumps, which are operated by a pivoting transmission member, wherein its pivot axis is movable relative to the pump.

A disadvantage of the known dispenser is that the disc-shaped transmitting element is simultaneously used to adjust the mixing ratio of the components, wherein an inclined position is taken for most ratios. This causes that the pump units are actuated in an "inclined" way, so that they are relatively sluggish, or the actuating force is relatively high. Further, on failure of the transmission element dispensing from the dispenser is no longer possible. In addition, the design and assembly of such a transmission element is relatively complicated because of its dual function.

Thus, it is the object of the present invention to overcome the disadvantages of the prior art and to provide a dispenser, which has a simple and assembly-friendly design.

This object is achieved by a dispenser having the features of claim 1. Advantageous embodiments of the invention are subject of dependent claims.

According to the invention a dispenser for dispensing a multi-component substance is provided, wherein at least two containers are provided for receiving the components of the substance. The containers may be formed in the manner of cartridges, i.e. with a rigid shell, but also as so-called bottles. Preferably, the respective containers are axially movable in the height direction of the dosing dispenser, so that they are easily replaceable. Preferably, they have a semicircular cross-section. The design of the container also complies with the viscosity of the components and their dispensing properties. Further, each of the containers, which are received in an outer sleeve, bears a pump unit for discharging of the respective components. The pump units may be designed as a piston pump, as a bellows pump or in any other suitable construction. The dispenser of the invention further comprises an adjusting device for adjusting the quantity ratio of the components of the substance to be dosed, a movable actuating device for the pump units, and a dispenser member, in particular in the form of nozzles for discharging the substance.

The dispenser is characterized in that a "separate" force transmission element is provided, which is moveable relative to the outer sleeve, such that it is displaced when the actuating unit is pressed in the axial direction of the dispenser (corresponding to the main extension of the cartridge or of the pump). Thus, the adjusting device is decoupled from the actuating device, so that these components can be easily assembled. Moreover, it is ensured that the pumps are exactly pressurized in their axial direction, such that standard pumps can be used, as well. The containers themselves are preferably mounted also in a movable way in their axial direction, so that these can initially "dodge" to the adjusting device in accordance with the desired mixing ratio. Thus, the respective distance from the container is variable, in particular in the form of an adjusting shim with thorn-like projections, that is rotatable around the vertical axis. The rotatable adjusting shim is coupled with the outer sleeve, which also constitutes the major part of the outer periphery of the dispenser, so that it can easily be adjusted by turning and may also be actuated with low forces. Further, the manufacturing costs are significantly reduced and the installation is simplified, particularly if these parts are moulded in one piece, especially by plastic injection moulding. The metering setting may also be fixed by the manufacturer e.g. 50:50 or 33:67, wherein the second container has a volume twice as large as the first cartridge.

An adjustment of the mixing ratio of the components is performed by changing the relative rotational position of the wedge plate, of the wedge ring, or the projections and the associated change in the distance of the wedge disc or the wedge ring, or projections on the containers or container floors. Due to the formation of the wedge disc or the wedge ring, the stroke of the pump units is changed and thus the amount of the component, which is conveyed through the respective pump unit. The components can be mixed at a dispensing nozzle, especially in an applicator according to WO 2006/11273 or may also be discharged unmixed. Thus, the proposed dispenser has a simple, robust construction and compact design. Preferably, the actuator is provided at the upper region of the dispenser, particularly in the form of a push-button. The force transmission element leads down in the interior of the dispenser to the adjusting device in order to dodge it downwardly. The force transmission element is generally urged to pressure, but can also be designed as a tension rod, to be arranged in the form of an intermediate wall between the containers, in order to give them additional guidance.

It is advantageous, that the adjustment device is continuously rotatable by the outer sleeve or formed with a plurality of detent positions for the defined rotation of the adjustment unit. In the configuration with a continuous rotation of the adjustment device, a free choice of mixing ratio is possible. In the above definition of detent positions adjustable mixing ratios are specified, wherein the number of the detent positions is oriented at the ultimately desired resolution of the mixing ratio. In an advantageous manner, the actuating means is designed as a wide-area push-button, which is guided in the upper portion of the sleeve via a long axial stroke. This results in a stable axial guide within the sleeve, so that even unequal actuating directions do not have an influence to the operating force of the pump units. Thus, the dispenser can be manufactured very compact and with low axial length. It is also possible that a mixing chamber is provided in the push-button to be upstream of the dispensing nozzle.

Further advantages, features and characteristics of the invention can be derived from the following description of preferred, but not limiting embodiments of the invention with reference to the schematic drawings. They show:

FIG. 1 is a sectional view of a dosing device with an adjusting device, actuating means and two containers with pump units, FIG. 2 shows the relevant section of the dispenser according to FIG. 1, but in an actuating position, FIG. 3 is a horizontal section through the bottom of the dispenser, FIG. 4 shows a further embodiment of a dosing device with an intermediate wall as a preferred force transmission element, FIG. 5 is a 90°-staggered section through the dispenser of FIG. 4, FIG. 6 is a section along line VI in FIG. 5, FIG. 7 shows a sectional view taken along the line VII in FIG. 5, FIG. 8 the intermediate wall in a plurality of views, and FIG. 9 shows a preferred adjusting shim in different views.

FIG. 1 shows a section through a dispenser 1 with two cartridge-shaped containers 6a and 6b, which have associated pump units 2a, 2b (only schematically shown, as known per se). The setting of the mixture is here performed by rotating an adjustment device 3 around the vertical axis by means of a cylindrical outer sleeve 8. When pressing an actuating device 4, the pump units 2a, 2b are actuated depending on the distance to the adjusting device 3, which is here shaped as a wedge ring 3' with different volume or delivery stroke. As shown in more detail in FIG. 8, the wedge ring 3' is preferably connected to a force transmission element 7 to form one unit, in particular designed as a moulded part. The rotatable wedge ring 3' of the adjustment device 3 is mounted with a pivoting axis 3a and bearing blocks 3b at the bottom of the outer sleeve 8 and has a clearance angle of about 25° to the horizontal near the bottom.

As shown in FIG. 2, by manual pressure on the actuating means 4, here in the form of a push-button 4' with an integrated dispenser 5 (cf. FIG. 7, in particular in the form of nozzles), the force transmission element 7 is pressed in the axial direction A towards the bottom, such that the wedge ring 3' is tilted downward with the right side (see also arrow X in FIG. 5). Thus, the right container 6b is moved downwards, or in other words, it is admitted that it can dodge down, while the left container 6a cannot dodge. Thus, the left container 6a is pumped with a larger supply stroke than the right container 6b, e.g. 90% of the total amount from the container 6a and 10% from the container 6b. When the adjusting device 3 is rotated by about 90° around the vertical axis via manual rotation of the outer sleeve 8, the two containers 6a and 6b with its pumping units 2a and 2b are in the same height position of the wedge ring 3', such that the flow of the pump units 2a and 2b are the same size, that is, the mixing ratio would be then about 50:50.

On rotation of the adjusting device 3 via the rotatable sleeve 8 by 180° with respect to the position shown in FIGS. 1 and 2 and pressure on the actuating device 4, the result is the opposite height positioning of the pump units 2a and 2b, so that the delivery stroke of the right pump unit 2b then would be e.g. 90%, while the left pumping unit 2a only contributes a delivery volume of approximately 10% of the total discharge rate, consisting of the components in the two container 6a and 6b. Ex factory usually a center position is preset, so that the two pumping units 2a, 2b have an identical stroke or a volume of 50% of the total discharge amount. Then the mixture contains equal parts of the two components. At intermediate positions of the adjusting device 3 between the above-mentioned positions corresponding intermediate ratios between the strokes or discharge volumes of the pumping units 2a, 2b (see in FIG. 2 shown different depths of the pump piston) arise, so that it is changeable for each component between 0%:100% and 100%:0%. For adjustment of the mixing ratio the cylindrical outer sleeve 8 is easily rotated relative to the push-button 4', as it can be gripped particularly well by the human hand by means of corrugations or the like on the outer circumference. The pressing of the button 4' is in kind of a spray can.

FIG. 3 shows a cross section of the lower portion of the dispenser 1, along the section line III in FIG. 1. It also shows the bottom part of the tubular force transmitting member 7, that controls the inclination of the wedge ring 3'. The wedge ring 3' is mounted in this case on the left side with its pivoting axis 3a on bearing blocks 3b on the bottom of the outer sleeve 8. The tubular-shaped force transmitting member 7 can also be in the form of a rod or a smaller-diameter tube, or a square profile from top to bottom of the dispenser 1. Thus, there's only a slight coupling between (top) actuator 4 and (lower) adjusting device 3. Thus, the force transmission element 7 may also have a relatively flat shape, as it is shown below in the form of an intermediate wall (see in particular also FIG. 8).

In FIG. 4, the adjusting device 3 is provided at the bottom of the container 6a, 6b as a wedge ring 3' with an adjusting shim 3c with two thorn-like projections 3" (see in particular FIG. 9), which can be adjusted by rotation of the outer sleeve 8 and pressed towards the bottom of each container 6a, 6b via the push-button 4'. In accordance to the rotational position of the adjusting device 3 (see FIG. 6) the thorn-like projections 3" are so positioned, that there results, on depression of the actuator 4, a greater flow from the container 6a, for example. In accordance with the previously described embodiment, the outer sleeve 8 of the dispenser 1 surrounds two pumping units 2a, 2b, for example in a piston design. The individual channels of the pumping units 2a, 2b flow into the dispensing nozzle 5. The intermediate wall as a preferred form of the force transmission element 7 is also used to securely guide the cartridges or containers 6a, 6b, which are also axially slidable within the outer sleeve 8 upon actuation of the push-button 4'. It is important that the intermediate wall as a power transmission element 7 can transmit the movement of the push-button 4' downwards to the wedge element 3' (cf. arrow X). The intermediate wall 7 does not have to be continuous, but may also be in form of a rod or tube down to the adjusting device 3.

FIG. 5 illustrates the wedge-shaped design of the wedge ring 3', which is preferably coupled with a lower hook of the intermediate wall 7, wherein these components can be designed for easy construction as a one-piece injection moulded part (cf. FIG. 8). Thus, a greater leverage can be achieved so that the actuating forces can remain low at the actuating device 4.

FIG. 6 shows the rotation of the adjusting device 3 with the projections 3", wherein also the lowermost portion of the intermediate wall 7 is visible. The two projections 3" are arranged on the rotatable adjusting shim 3c (see FIG. 9), which is coupled by a pin 8a with the rotatable outer sleeve 8. Depending on their rotational position, the projections 3" are differently moved in the vertical direction, so as to vary the mixing ratio of the containers 6a and 6b. Only in the middle position the range of motion is the same, so that there results a balanced blend ratio (50:50), since then (in contrast to the position shown in FIG. 6) after rotation of both projections 3" here about 70° (cf. arrow Y) in the counter-clockwise direction they would have the same distance to the intermediate wall 7. Thus, the mixing ratio can be set so by simply rotating the outer sleeve 8.

FIG. 7 shows a horizontal section through the uppermost portion of the push-button 4' to the dispenser element 5. This one is divided into two parts, wherein the respective component from the container 6a or 6b is guided separately in channels 5' to the outlet from the dispensing nozzle 5. The dispensing nozzle 5 may also have a mixing chamber, in particular a static mixer for mixing the components prior to discharge. In this plan view it is also apparent that the intermediate wall as a preferred form of a force transmitting member 7 engages with an upper pin 7' in the push-button 4', so that a rotation lock is obtained.

FIG. 8 shows this intermediate wall with the pin 7' is in several views, wherein the wedge ring 3' is coupled via a film hinge 3d. Thus, it is possible to manufacture the assembly as a moulded part and the installation in the dispenser 1 is fast and simple. The hinge 3d then replaces the parts 3a and 3b of FIGS. 1 to 3 and is therefore particularly easy to install. For the adjustment of the metering, the aforementioned adjusting shim 3c is simply clipped to the wedge ring 3', as it is indicated in the top left of FIG. 8 with a dashed line. The perspective view in FIG. 8 clearly shows the slim, compact design of the force transmission element 7.

In FIG. 9 the adjusting shim 3c with the two projections 3" to act on the bottom of the container 6a, 6b is shown in several views. Here, the radial pin 8a for coupling with the rotatable outer sleeve 8 is clearly visible (see also FIG. 6), as well as a pivot 3e to clip into the centre of the wedge ring 3'. Thus, it is possible to mount the adjusting device 3 and adjoining parts quickly together for a dispenser 1.

LIST OF REFERENCE NUMERALS

1=Dispenser
2a,b=pump unit
3=adjusting device
3'=wedge ring
3"=projections
3a=pivot axis
3b=bearing blocks
3c=shim
3d=hinge
3e=clip
4=actuating device
4'=push button
5=discharge element
5'=channel
6a, 6b=container
7=force transmission element
7'=pin
8=sleeve
8a=(radial) pin

The invention claimed is:

1. A dispenser (1) for dispensing a multi-component substance, comprising:
   at least two containers (6a, 6b) in an outer sleeve (8) for receiving the components of the substance;
   a pump unit (2a, 2b) on each of the containers (6a, 6b);
   an adjusting device (3) for adjusting the ratio of the components to each other;
   a movable actuating device (4) for the pump unit (2a, 2b) and/or container (6a, 6b), and
   a dispenser unit (5) for the substance to be discharged from the dispenser (1), wherein
   a force transmission element (7) is connected to the adjusting device (3) and is disposed between the containers (6a, 6b), formed as an intermediate wall which is displaceable relative to the outer sleeve (8) in the axial direction (A) of a dosing dispenser (1) on actuation of the movable actuating device (4).

2. The dispenser (1) according to claim 1, wherein the outer sleeve (8) forms the outer periphery of the dispenser (1), having on the outer circumference corrugations.

3. The dispenser (1) according to claim 1, wherein said adjusting device (3) is mounted at the bottom of the outer sleeve (8), to a pivot axis (3a), which engages in bearing blocks (3b).

4. The dispenser (1) according to claim 1, wherein the actuating device (4) is formed as a push button (4').

5. The dispenser (1) according to claim 1, wherein the force transmission element (7) and the adjusting device (3) are integrally formed, as a plastic injection molded part.

6. The dispenser (1) according to claim 1, wherein the adjusting device (3) is formed as a tapered ring (3') and/or has projections (3"), which are aligned in the axial direction (A) of the dispenser (1).

7. The dispenser (1) according to claim 1, wherein the pump units (2a, 2b) are connected to the dispenser unit (5) via channels (5'), which are molded in the push button (4').

8. The dispenser (1) according to claim 1, wherein the force transmission element (7) has a pin (7') connected to the actuating device (4).

9. The dispenser (1) according to claim 1, wherein an adjusting shim (3c) of the adjusting device (3) is provided with projections (3") and the sleeve (8) is coupled to the adjusting device (3) in a rotational direction by a radially aligned pin (8a).

* * * * *